United States Patent
Chappell

(10) Patent No.: US 9,827,915 B1
(45) Date of Patent: Nov. 28, 2017

(54) EXPANDABLE CARGO RACK SYSTEM

(71) Applicant: Ryan Patrick Chappell, Lake Forest, CA (US)

(72) Inventor: Ryan Patrick Chappell, Lake Forest, CA (US)

(73) Assignee: Ryan P. Chappell, Lake Forest, CA (US)

( * ) Notice: Subject to any disclaimer, the term of this patent is extended or adjusted under 35 U.S.C. 154(b) by 0 days.

(21) Appl. No.: 15/294,688

(22) Filed: Oct. 15, 2016

(51) Int. Cl.
*B60R 9/045* (2006.01)

(52) U.S. Cl.
CPC .................................. *B60R 9/045* (2013.01)

(58) Field of Classification Search
CPC .......... B60R 9/045; B60R 9/042; B60R 9/058
See application file for complete search history.

(56) References Cited

U.S. PATENT DOCUMENTS

| | | | | |
|---|---|---|---|---|
| 2,641,396 A * | 6/1953 | Parr | ......................... | B60R 9/058 160/223 |
| 2,663,472 A * | 12/1953 | Belgau | .................... | B60R 9/058 224/320 |
| 3,002,664 A * | 10/1961 | Guevara | ................. | B60R 9/045 224/314 |
| 3,061,256 A * | 10/1962 | Feinstein | ................ | B60R 9/045 224/320 |
| 3,722,765 A * | 3/1973 | Binding | .................... | B60R 9/04 224/320 |
| 4,265,382 A * | 5/1981 | Edwards | ................... | B60R 9/06 224/309 |
| 5,009,337 A * | 4/1991 | Bimbi | ....................... | B60R 9/00 224/314 |
| 5,360,150 A | 11/1994 | Praz | | |
| 5,421,495 A | 6/1995 | Bubik et al. | | |
| 6,015,074 A | 1/2000 | Snavely et al. | | |
| 6,425,508 B1 * | 7/2002 | Cole | ........................ | B60R 9/045 224/320 |
| D520,938 S * | 5/2006 | Badillo | ......................... | D12/412 |
| 7,237,826 B2 | 7/2007 | Sagi et al. | | |
| 7,246,839 B1 | 7/2007 | Nyberg | | |
| 8,016,172 B1 * | 9/2011 | Mefford | .................. | B60R 9/045 224/319 |
| 2004/0173651 A1 * | 9/2004 | Kim | ......................... | B60R 9/042 224/310 |
| 2004/0195866 A1 * | 10/2004 | Fin | .......................... | B60R 9/045 296/210 |
| 2008/0149675 A1 * | 6/2008 | Moreau | ................... | B60R 9/045 224/320 |

* cited by examiner

*Primary Examiner* — Corey Skurdal
(74) *Attorney, Agent, or Firm* — James F. Kirk

(57) ABSTRACT

The Expandable Cargo Rack System (ECRS) is a cargo rack assembled from a front section, a rear section and one or more intermediate sections that are interconnected in a sequential string with one or more intermediate sections to change the length of the rack. An alternative embodiment of the (ECRS) has a forward section with a gradual downward slope to contour a windshield of an automobile as an ornamental feature.

1 Claim, 8 Drawing Sheets

FULL RACK WITH
RUBBER CONNECORS ically determined from market and vehicle considerations.
EXPANDABLE CARGO RACK SYSTEM This application claims priority from U.S. Ser. 62/240,537, a provisional patent application, for an "Expandable Cargo Rack" filed on Oct. 16, 2015 having a common sole inventor Ryan Patrick, Chappell. This reference is incorporated by reference into this application in its entirety.

No Government funds or material was used in the development of this invention or in the development of the above referenced provisional application.

BACKGROUND

The invention relates to the field of cargo racks. There are multiple examples of cargo racks available to consumers. The current offerings are flat with fixed dimensions, typically bolted onto a surface with various types of hardware. Current fixed dimension cargo racks are suitable for most applications but lack a sufficient amount of cargo space for some consumers. Many of the cargo carriers discovered in the art were designed to accommodate long articles such as skis by providing roof rails that traversed the roof of a vehicle at a right angle with the longitudinal axis of the vehicle. Others provided hinges that allowed the surface of the cargo rack to be released and rotated on an axis co-linear with the length of the vehicle and hinged to permit the surface of the cargo rack to be draped on the side of the vehicle. None of the cargo racks provided a basket with top and bottom rims convenient for lashing goods to hold them in the basket. None provided a forward section that was formed to slightly droop over windshield. Cargo racks available commercially typically have a fixed length and are not known to be adjustable to accommodate the length of the roof on the vehicle to which it is affixed.

SUMMARY OF THE INVENTION

The Expandable Cargo Rack Systems allows for the consumer to use a number of individual sections joined together to form a cargo rack of the consumers desired size. Each of the individual sections shares the same dimensions and can all be conjoined by the same set of hardware and connection pieces.

Multiple sections of different styles can be joined together in an assortment of configurations to best suit a consumer's needs. The cargo rack system is flexible in length with the addition or subtraction of intermediate sections. The intermediate sections can be made with a length that is empirically determined from market and vehicle considerations. The length of the front section and the rear section when combined without an intermediate section will determine a length suitable for the shortest length vehicle roof that is practical. As longer roofs require longer cargo racks, added intermediate sections will be inserted in between the front section and the rear section. The width of the cargo rack sections is a design choice dictated by market and government safety requirements.

The cargo rack system offers numerous configurations for consumers, and offers an individual section that is sloped so that it can follow the contour of a windshield if used on an automobiles roof. Multiple sections of different styles are shown joined together in an assortment of configurations to best suit a consumer's needs.

The Expandable Cargo Rack System works by inserting one or more intermediate sections connected together to form a cargo rack that provides a basket that provides an unrestricted channel from the rear inner edge of its top front rim to the front inner edge of its rear rim. The consumer has the option of adding or removing as many intermediate sections as the consumer finds convenient for the length of the mounting space on top of the vehicle as the length of the cargo rack expands or contracts to fit the cargo rack to a desired size.

The Expandable Cargo Rack System can be used on a variety of vehicle types. In addition to autos, the vehicle types include but are not limited to busses and recreation vehicles. The cargo rack system can also be rotated as required for use on wider vehicle surfaces. Examples include mounting the cargo rack to the roof of a vehicle, to the top of a roll cage, to the top of a marine pilothouse, over the bed of a pickup truck, etc.

DESCRIPTION OF THE INVENTION

Figure 1:
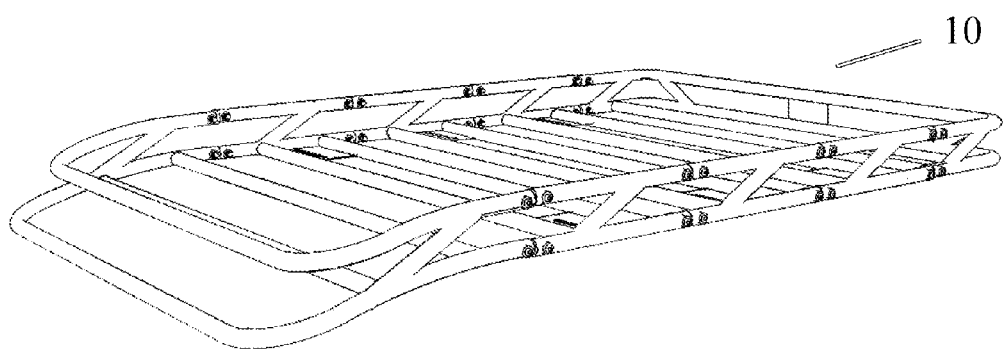
FIG. 1 is a left raised perspective view that shows a cargo rack with five modular sections.
Figure 2:
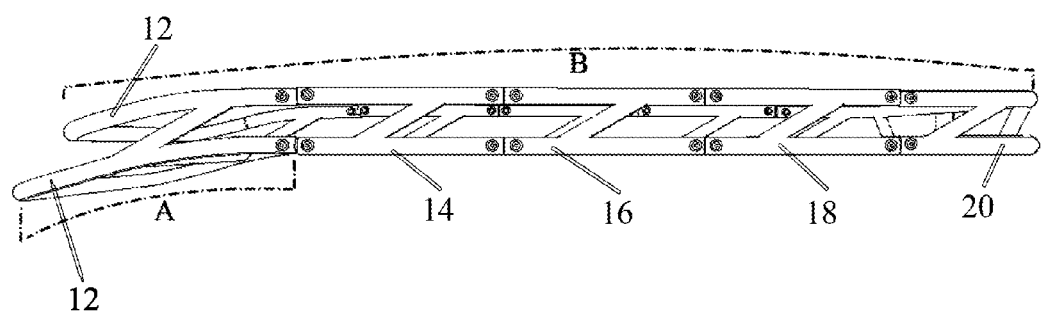
FIG. 2 is a left side view of the cargo rack of FIG. 1 with a phantom bracket A showing the limits of a front section bottom rim and a front section top rim that slope down to the contour of a windshield, and with phantom bracket B capturing a first, a second a third intermediate section and a rear section coupled to extend the cargo rack to a predetermined length.

FIG. 1 shows the Expandable Cargo Rack 10, as an assembly in the claimed Expandable Cargo Rack System (ECRS), The ECRS 10 allows the use a number of individual sections joined together to form a cargo rack having a length that fits the consumers desired size. Referring now to FIG. 2, a left side view of the ECRS shown in FIG. 1, the sections shown include a front section 12 included within phantom bracket "A", a first intermediate section 14, second and third intermediate sections 16, 18 and a rear intermediate section 20. Each of the individual sections shares the same interface dimensions and can be joined by the same set of hardware and connection pieces as will be discussed in the following description.

FIG. 2 is a side view of the cargo rack of FIG. 1 with a modification of the front section 12. When desired, the front section 12 is formed to have a slope as shown in region A of FIG. 2 where it contours to the front windshield extends outward beyond the top edge of the windshield (not shown) and roofline of the vehicle thereby maintaining a low profile over the roof and extending the reach of the cargo rack 10.

Figure 3:
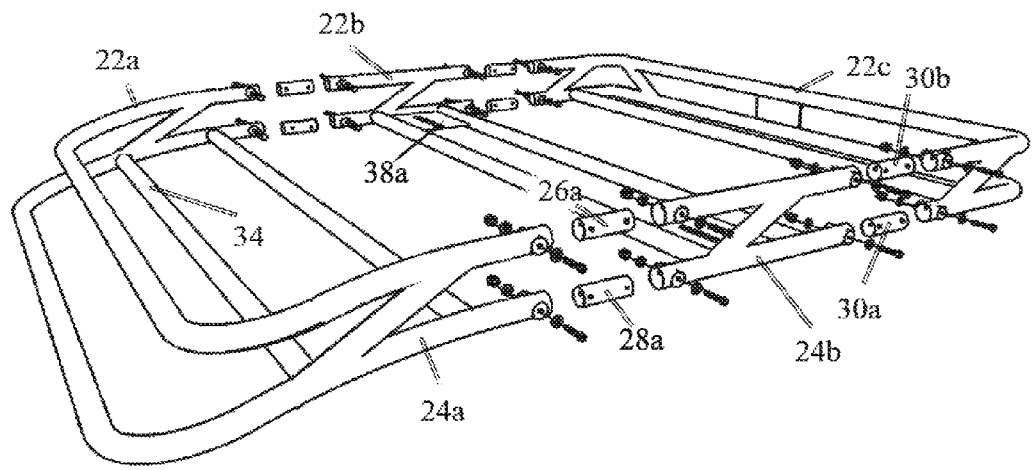
FIG. 3. is a raised left perspective exploded view of a cargo rack with a front section, a rear section and a inter- mediate section.

FIG. 3 is an exploded view of an ECRS 10 with a single intermediate section. The ECRS 10 has a front section with a top rim 22a and a bottom rim 24a. A first intermediate section has a top rim portion 22b, and a first intermediate section, bottom rim portion 24b, A first floor tube 34 extends from the left to right side of the bottom rim and is fixed by welds to the front section bottom rim 24a. The first floor tube 34 is followed by a sequence of floor tubes that are at the same bottom rim level as shown and that extend across the bottom rim from the left to the right side to provide a stiff floor. Mounting plate 38a is shown inserted between the floor tubes 34 at their ends and attached to the bottom rim to provide mounting surfaces for hinged mounting plates to receive mounting bracket assemblies 42a, 42b (not shown) which will be shown in connection with FIG. 15 and FIG. 16, The interface between the top and bottom rim surfaces are coaxially aligned and the tube diameters of the rim portions are all the same allowing all sections of the cargo rack to be interchangeable. The universal connector piece 28a and 28b shown in FIG. 3 and FIG. 4 have external diameters that allow insertion into the opposing ends of the top and bottom rim sections that are to be joined.

Figure 4:
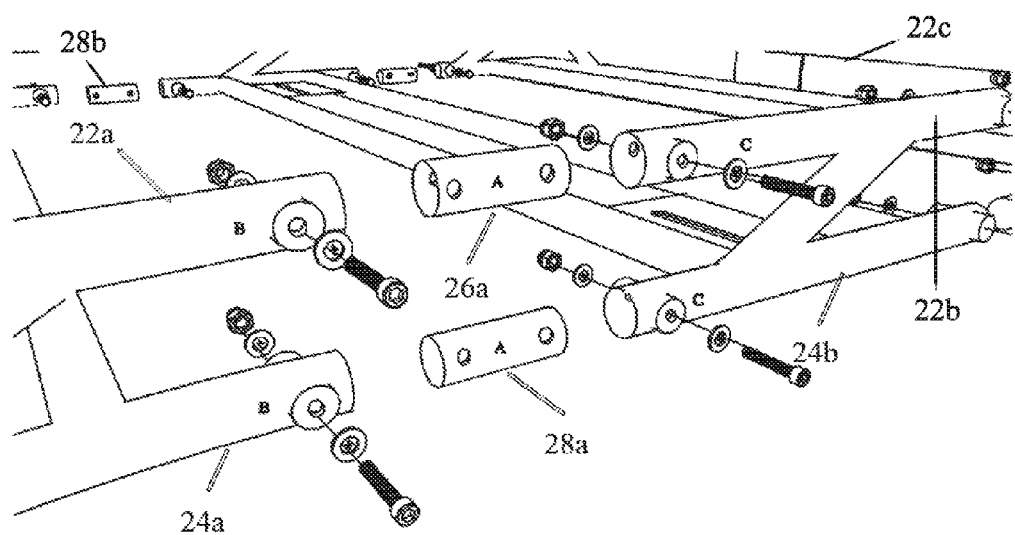
FIG. 4. is an exploded perspective view of a coupling of the top and bottom rim of a first and second section.

FIG. 3 shows the top rim generally as 22a, 22b, 22c and the bottom rim generally as 24a, 24b and 24c the segments being either in the front section, the intermediate section or the rear section. FIG. 4 shows an expanded or exploded view of two separate sections with the universal connector pieces in place ready for insertion into the top and bottom rim tubes.

The universal couplers 28a, 26a shown in the exploded view of FIG. 4 are typically cylindrical sleeves or dowels made of aluminum. Referring to FIG. 4, the sleeves 28a, 26a are made with a diameter that permits a portion of a sleeve or dowel to be inserted into a cylindrical receiving aperture such as the tubes shown at the left and right of the parts which form a portion of the forward section interface at 22a and the end of 24a and to insert the remainder of the sleeve 26a, 28a or dowel into a corresponding receiving aperture in the first forward intermediate section interface axially aligned and to the right of the sleeve 26a, 28a to align and link the corresponding receiving apertures. If the universal couplers are formed from a high durorneter or solid hard rubber tube, and if a small clearance is reserved between top and bottom rim tube sections, the intermediate sections can be formed to reside on an undulating or curved surface.

The Expandable Cargo Rack System is constructed from a number of different materials. The material list for the main cargo rack structure includes tubular material selected from tubular carbon steel, stainless steel, aluminum, or carbon fiber. The connector pieces shown in FIG. 3 are formed from material selected from the group including carbon steel, stainless steel, aluminum, carbon fiber or high durometer rubber. The hardware used in the connection of the individual cargo rack sections and connector pieces are selected from one or more of the following: zinc plated steel, stainless steel, or nylon.

Figure 5:
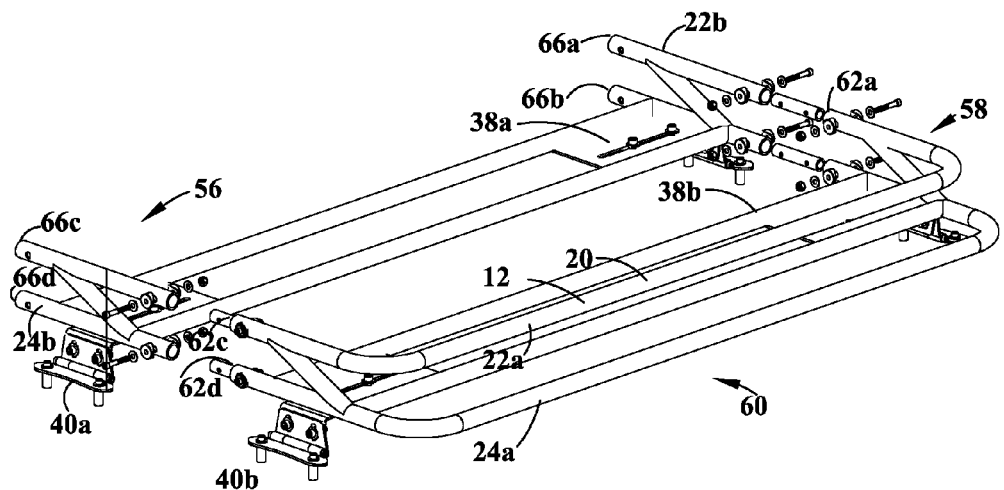
FIG. 5. is an elevated left perspective exploded view of the rear section of a cargo rack showing a a first intermediate section with a mounting bracket assembly on each of the sections.
Figure 6:
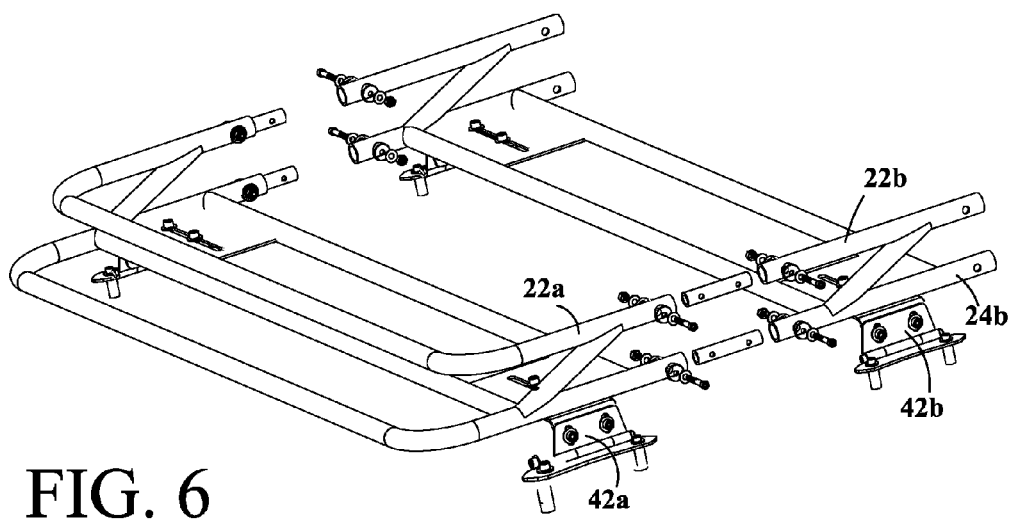
FIG. 6. is a left raised perspective exploded view of a front portion of a cargo rack showing a front section without a slope and a first intermediate section, with a mounting bracket assembly on each of the sections.
Figure 15:
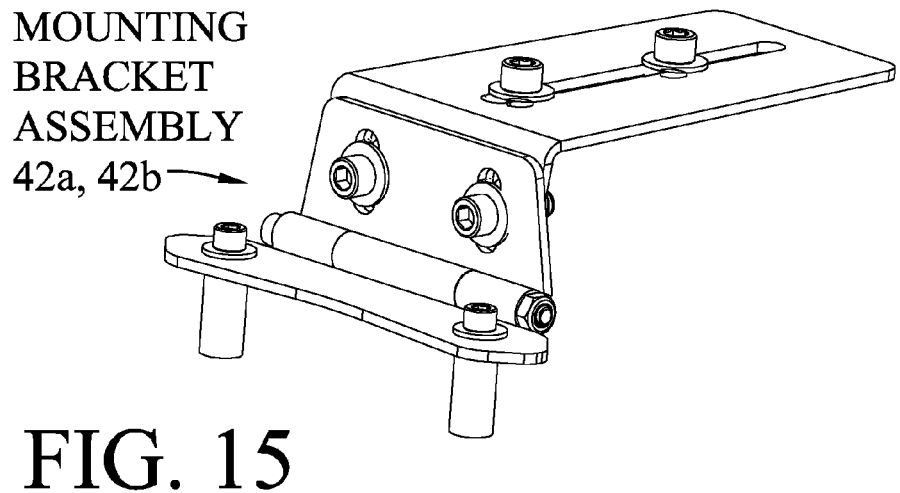
FIG. 15. is an assembled right perspective view of a mounting bracket assembly with a hinged surface mounting plate.

FIG. 5. is an elevated left perspective exploded view of a rear section 20 of a cargo rack showing the front section and a first intermediate section, with a mounting bracket on each of the sections. The view of FIG. 5 is said to be "left side" because the side shown is on the left of a driver that is facing forward in a vehicle below the ECRS. FIG. 5 also shows a plurality of mounting plates 38a. 38b positioned between tubular members and coupled to the floor tubes. The mounting plates 38a, 38b provide surfaces to which mounting bracket assemblies 42a, 42b are coupled. FIG. 15 shows a mounting bracket assembly 42a, 42b.

Figure 7:
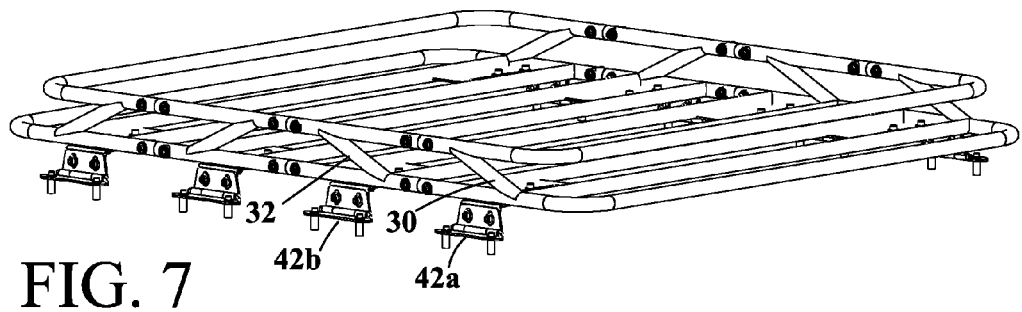
FIG. 7. is a raised right perspective view of a cargo rack showing a front section without a slope, a first intermediate section, a second intermediate section and a rear section with a mounting bracket on each of the sections.
Figure 8:
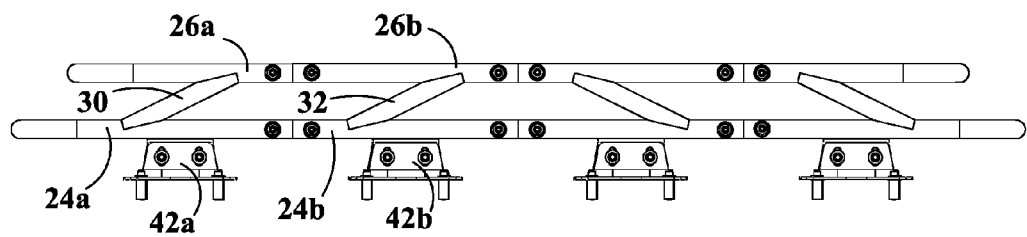
FIG. 8. is a right side view of the cargo rack of FIG. 7 showing the front section on the right, followed by a first and a second intermediate section with the rear section on the left of the drawing and with mounting bracket assemblies on each of the sections.
Figure 9:
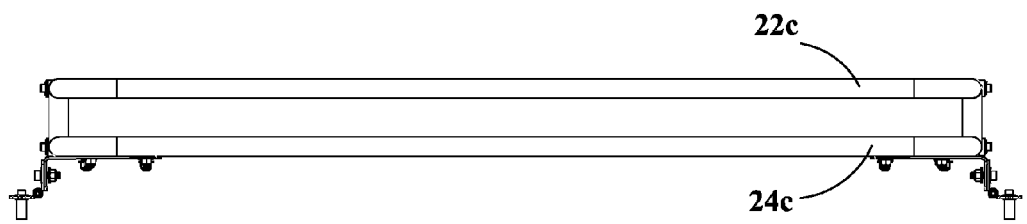
FIG. 9. is a rear view of the cargo rack of FIG. 8 with edge views of the mounting bracket assemblies on the left and right sides of the cargo rack.

Referring to FIGS. 7 and 8, the top rim and the bottom rim are shown to be separated by an array of elongated angularly orientated web members 30, 32 in which each respective array member has a first end coupled to the bottom rim 24a and a second end coupled to the top rim 26a with the length and angular orientation of the angularly orientated members being selected to space the top rim above the bottom rim at a predetermined distance.

The Expandable Cargo Rack System is coated with material selected from the group that includes powder coating, paint, clear coat, spray-on-bed liner, epoxy, hydro-dipped film, and vinyl.

As shown in FIGS. 3, 4, 5, 6, 11, 13 as an ECRS of varying length is assembled, the universal connector is placed in between the open ends of the tubes that form upper and bottom rim in each section. After positioning and coaxially aligning the axis of the rim tubes, and adjusting the linear position to align the drill holes, the cross bolts are inserted in one section with the bolt passing through the rim tube and the universal coupling. The bolts are then fastened with hardware to keep it or them in place. The remaining rim tubes are then aligned and then guided onto or "slid" over the remaining portion of the respective universal connectors and fastened with hardware to keep them in place.

FIG. 7. is a raised right perspective view of a cargo rack showing a front section without a slope, a first intermediate section, a second intermediate section and a rear section, the ECRS assembly being complete with a mounting bracket on each of the sections. FIG. 7 also shows that the sections on the front and rear ends are the same. A front section is not formed to follow the windshield; however, the end sections are identical thereby eliminating a section type and reducing the parts count where there is no need for front section that follows the windshield.

Figure 10:
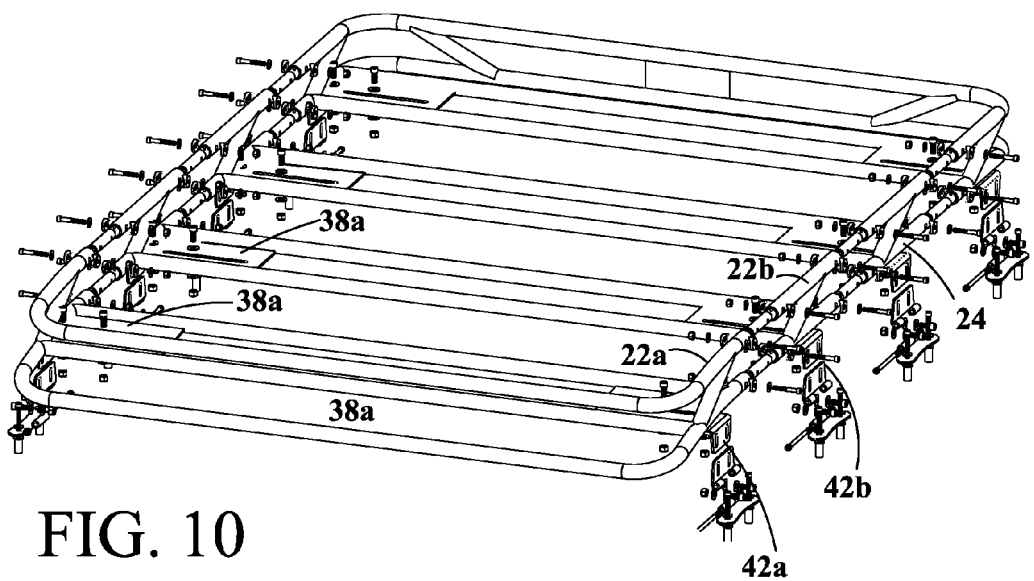
FIG. 10. is a raised left perspective view of a cargo rack with a sloped front section having a bottom rim that slopes down, a first and second intermediate section, and a rear section. Exploded mounting bracket assemblies are shown and mounting plates are shown in the floor of the cargo rack.
Figure 11:
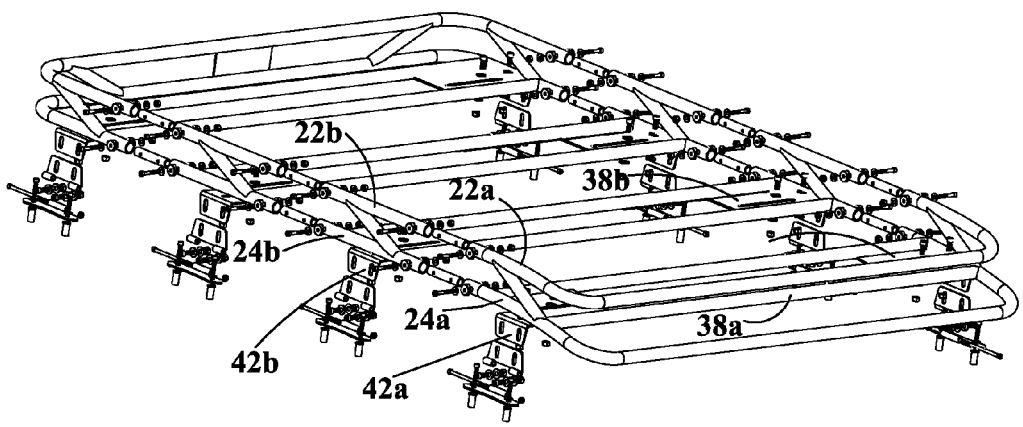
FIG. 11. is a raised right perspective view of a cargo rack with a front section having a bottom rim that slopes down, a first and second intermediate section, and a rear section. Exploded mounting bracket assemblies are shown and mounting plates are shown in the floor of the cargo rack.

FIG. 10. and FIG. 11 are left and right raised perspective views of the same ECRS with two intermediate sections and with eight hinged mounting plates ready for installation. Mounting plates are also visible between the floor tubes 34. A parallel array of tubular members or floor tubes 34 forms the floor of the basket. Each tubular member is coupled, typically by welding, to pass from the bottom rim right side to the bottom rim left side. Spacing of the floor tubes is a design task.

FIG. 10 and FIG. 11 show the top rim and the bottom rim of the ECRS comprised of segments 22a, 22b. on the top rim and 24a, 24b, forming segments of the bottom rim which in combination, when separated in height, form a basket. FIG. 10 shows that the channel of the basket thus formed is a clear channel with no vertical or transverse obstructions. That feature allows a user to lay long articles in the basket in which they can be shipped without damage or is safety not available where the basket is either not extendable, not clear, or obstructed by some other structural feature resulting from an initial design limitation or a modification. An array of elongated angularly orientated tubular web members is shown in FIG. 10 and FIG. 11 supporting the position of the top rim above the bottom rim. The tubular web members appear at an acute angle with the bottom rim and the top rim. Each respective web member has a first end coupled to the bottom rim and a second end coupled to the top rim. The length and angular orientation of the web members is selected to space the top rim above the bottom rim at a predetermined distance to thereby control the depth of the basket.

Figure 12:
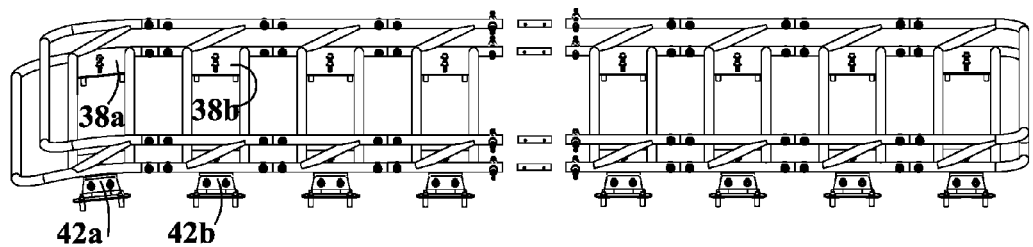
FIG. 12. is a raised left perspective view of a cargo rack. A front section has a bottom rim that slopes down, a first, a second, a third, a fourth, a fifth and a sixth intermediate section are shown, an exploded mating section is shown between the third and fourth intermediate sections. Mounting brackets are shown on each section and mounting plates are shown in the floor of the cargo rack coupled between floor tubes.
Figure 13:
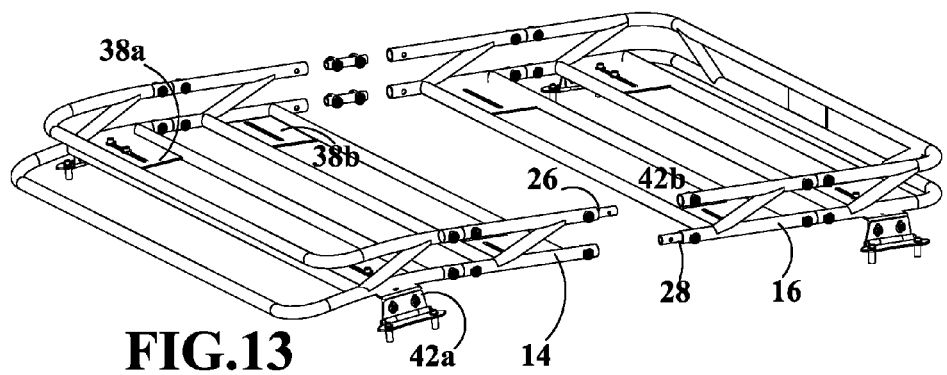
FIG. 13. is a raised left perspective view of a cargo rack. A front section has a bottom rim that slopes down. A first, and a second intermediate section are shown with a separation between them. Mounting bracket assemblies are shown on the front and rear sections and mounting plates shown in the floor of the cargo rack coupled between floor tubes.
Figure 14:
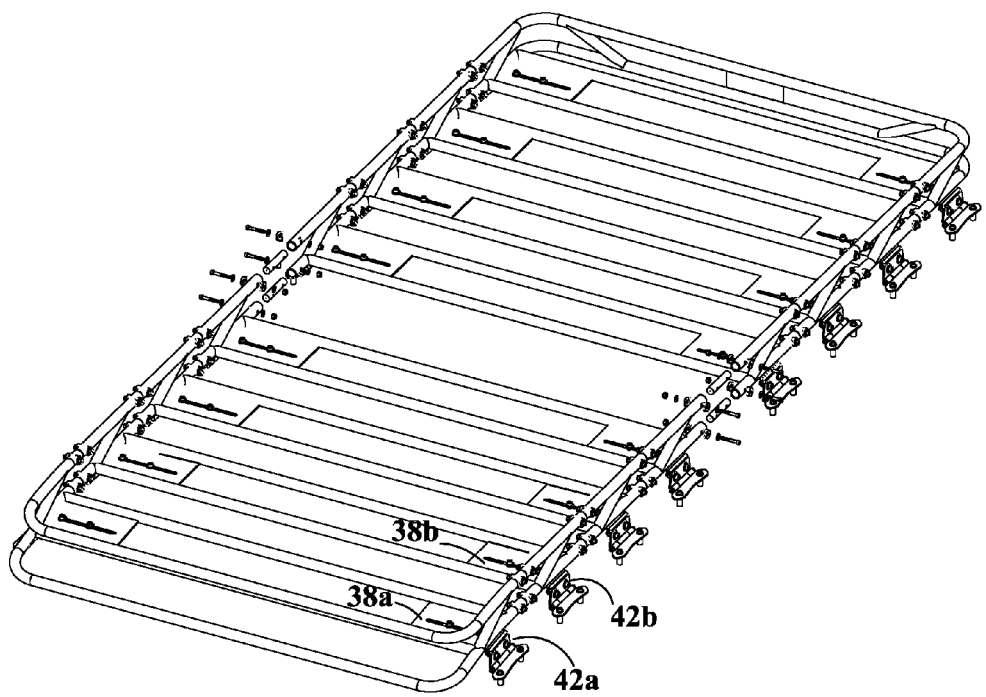
FIG. 14. is a lowered left perspective view of the cargo rack of FIG. 12 with a first, a second, a third, a fourth, a fifth and a sixth intermediate section, an exploded mating section is shown between the third and fourth intermediate sections, and a rear section. Mounting brackets are shown on each section and mounting plates are shown in the floor of the cargo rack.

FIG. 12 is an elevated left perspective of an ECRS using six intermediate sections with hinged mounting assemblies deployed. This FIG. shows how extreme length can be obtained. Floor plates 38a, 38b are visible and a four universal couplers appear at the center of the ECRS in preparation for assembly or as a result of disassembly. Floor plates 38a, 38b are also shown in FIG. 13 and FIG. 15, FIG. 14 shows a full ECRS with rubber connectors. The rubber connectors pass from and through the hinge plate 50 shown in FIG. 16 through the roof of the receiving vehicle and are then coupled to the roof with screws which expand, seal and grip the hole through which the rubber connector passes. Sealing is necessary to obtain a water free environment below the roof.

Figure 16:
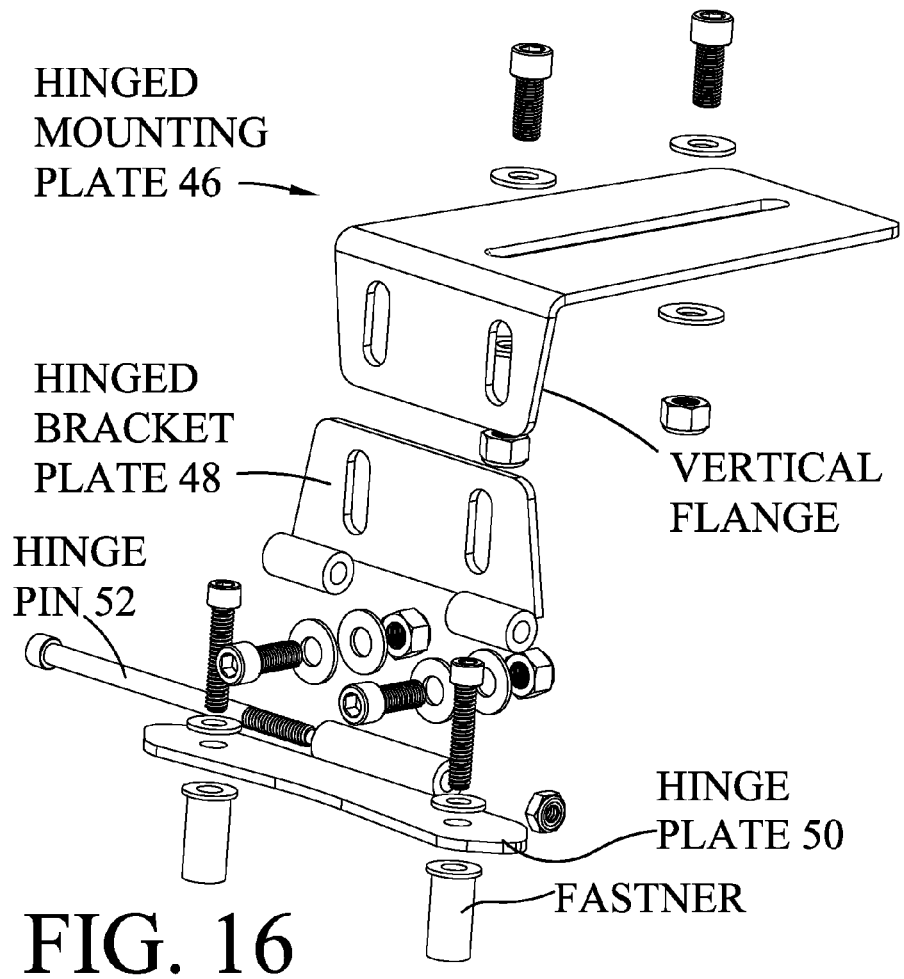
FIG. 16. is an exploded perspective view of the mounting bracket assembly of FIG. 15.

FIG. 16 shows an exploded view of a mounting bracket assembly 42a, 42b. An hinged mounting plate 46 is coupled with the use of cap screws and nuts to a mounting plate 38a, 38b (such as shown in FIGS. 12, 13, 14) secured in the tubular floor of the ECRS. Cap screws are shown as an example of how the attachment can be achieved. Hinged bracket plate 48 is then bolted to the vertical flange of the hinged mounting plate 46. The hinge plate 50 is then coupled rotationally to the hinged bracket plate 48 with the hinge pin 52.

The top rim and bottom rim shown in FIG. 10 and other figures establish the shape of the ECRS as being a quasi rectangular shape.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An expandable cargo rack coupled to a vehicle roof, the cargo rack comprising:
   an expanded basket having
   a forward section having a forward section interface, and
   a rear section having a rear section interface congruent with the forward section interface, the basket being expanded by the insertion of
   a first intermediate section of predetermined length formed to provide an open channel between the forward section and the rear section, the first intermediate section having
   a first intermediate section interface at its forward end matched to be congruent with the forward section interface and
   a first intermediate section interface at its rear end matched to be congruent with the rear section interface,
   the first intermediate section being positioned between the forward section and the rear section to form an open channel that extends from the forward section to the rear section passing through the first intermediate section with
   the forward section interface, the first intermediate section interface at its forward end being coaxially aligned, and coupled, and with the first intermediate section interface at its rear end and the rear section interface being coaxially aligned, and coupled to form the expanded basket,
   the forward section, the first intermediate section and the rear section each have
   an axially aligned top rim segment, and
   an axially aligned bottom rim segment,
   the top and bottom rim segments extending in respective continuous sequences from the front section, to the first intermediate section and thence to the rear section, with the front section, first intermediate section and rear section being coupled to form,
   a quasi-continuous top rim and
   a quasi-continuous bottom rim,
   that form the outer boundary of the open channel,
   the top rim and bottom rim that form the basket further comprise:
   an array of elongated angularly orientated web members in which each respective web member has a first end coupled to the quasi-continuous top rim and a second end coupled to the quasi-continuous bottom rim, the length, and angular orientation of each web respective member being an acute angle with respect to the quasi-continuous bottom rim and being selected to space the quasi-continuous top rim above the quasi-continuous bottom rim at a predetermined distance, and wherein the quasi-continuous top rim and the quasi-continuous bottom rim are each further characterized to have a right side and a left side orientated to be parallel to the longitudinal axis of the vehicle, the expandable cargo rack further comprising a floor formed from a parallel array of tubular members, each tubular member being coupled from the bottom rim right side to the bottom rim left side, a plurality of mounting plates being positioned between the tubular members, each respective mounting plate being characterized to receive and support a mounting bracket assembly, each mounting bracket assembly coupled to a mounting plate further comprising a hinged mounting plate having a vertical flange, each respective hinged mounting plate being coupled to a respective mounting plate between tubular members, a hinged bracket plate is coupled to the vertical flange of each respective hinged mounting plate, a hinge pin couples each respective hinge plate to a respective hinged bracket plate, each respective hinge plate is coupled to the vehicle roof.

* * * * *